United States Patent

Carr et al.

[15] 3,700,695
[45] Oct. 24, 1972

[54] FLUORINATED TETRAHYDRO-PYRANS

[72] Inventors: Russell L. K. Carr, Grand Island, N.Y.; Charles F. Baranauckas, Edina, Minn.

[73] Assignee: Hooker Chemical Corporation, Niagara Falls, N.Y.

[22] Filed: Oct. 16, 1969

[21] Appl. No.: 868,288

Related U.S. Application Data

[63] Continuation-in-part of Ser. Nos. 178,227, March 8, 1962, abandoned, and Ser. No. 716,273, March 14, 1968, abandoned.

[52] U.S. Cl. ......... 260/345.8, 260/345.1, 260/345.9, 260/347.2, 260/347.4, 260/347.8, 260/346.1 R, 260/92.8 R, 71/88
[51] Int. Cl. .............................................. C07d 7/04
[58] Field of Search ................................. 260/345.8

[56] References Cited

UNITED STATES PATENTS 2,962,523  11/1960  Godt................... 260/345.8 X
2,831,000  4/1958  Buckley et al. ......... 260/345.8

*Primary Examiner*—Norma S. Mileston
*Attorney*—Peter F. Casella, Donald C. Studley, Richard P. Mueller, James F. Mudd and William J. Schramm

[57] ABSTRACT

There are described new compositions of matter having the following general formula

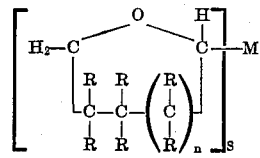

wherein $n$ is from 0 to 1, wherein one of the R's is selected from the group consisting of fluorine, alkyl, cycloalkyl, aryl, perfluoroalkyl, perfluorocycloalkyl and perfluoroaryl, wherein another one of the R's may be selected from the group consisting of alkyl and perfluoroalkyl, wherein the remaining R's are selected from the group consisting of hydrogen and fluorine, provided that at least one of the R's contains fluorine or is fluorine, $s$ is a number from 1 to 3 inclusive, and M is a substance selected from the group consisting of fluorine, chlorine, bromine, iodine, cyano, alkylcarbonyloxy, arylcarbonyloxy, cycloalkylcarbonyloxy, alkylsulfonyloxy, cycloalkylsulfonyloxy, arylsulfonyloxy, phosphinylidynetrioxy, phosphinidynetrioxy, alkoxyphosphinidenedioxy, dialkoxyphosphinoxy, aryloxyphosphinidenedioxy, diaryloxyphosphinoxy, alkylphosphinylidenedioxy, arylphosphinylidenedioxy, sulfonyl and sulfinyl. The preparation of these compounds and their uses in improving the clarity of plastic films and as herbicides are also described.

1 Claim, No Drawings

FLUORINATED TETRAHYDRO-PYRANS

This is a continuation-in-part of Ser. No. 178,227, filed in March 8, 1962 now abandoned, and Ser. No. 716,273, filed March 14, 1968 now abandoned. This invention relates to novel fluorinated tetrahydropyrans and novel fluorinated tetrahydrofurans, a process for preparing said compounds, and their uses in improving the clarity of plastic films and as herbicides. In accordance with the present invention there are provided novel compositions of the following general formula:

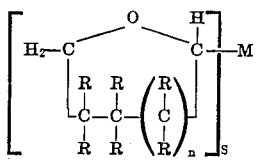

wherein $n$ is from 0 to 1, wherein R is independently selected from the group consisting of fluorine, perfluoroalkyl, perfluorocycloalkyl and perfluoroaryl, $s$ is a number from one to three inclusive, and M is selected from the group consisting of fluorine, chlorine, bromine, iodine, cyano, alkylcarbonyloxy, arylcarbonyloxy, cycloalkylcarbonyloxy, alkylsulfonyloxy, cycloalkylsulfonyloxy, arylsulfonyloxy, phosphinylidinetrioxy, phosphinidynetrioxy, alkoxyphosphinidenedioxy, dialkoxyphosphinoxy, arylphosphinylidenedioxy, diaryloxyphosphinoxy, alkylphosphinylidenedioxy, arylphosphinylidenedioxy, sulfonyl and sulfinyl. Also, in accordance with the present invention there is provided a process for the preparation of said compounds.

The following are typical of those compounds included within the scope of the instant invention:

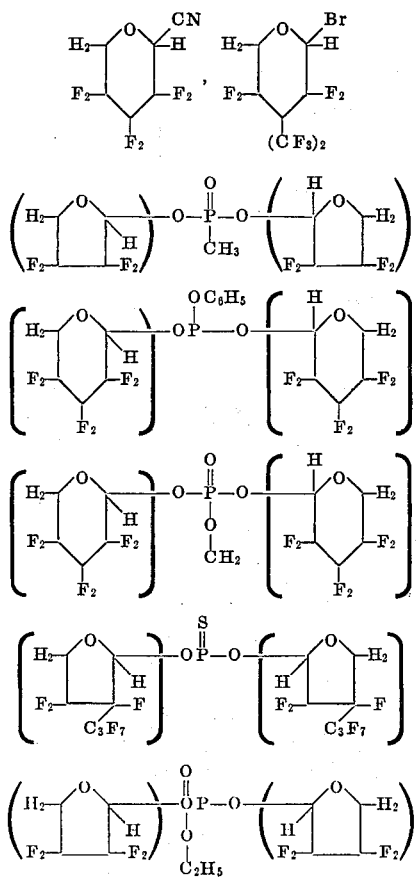

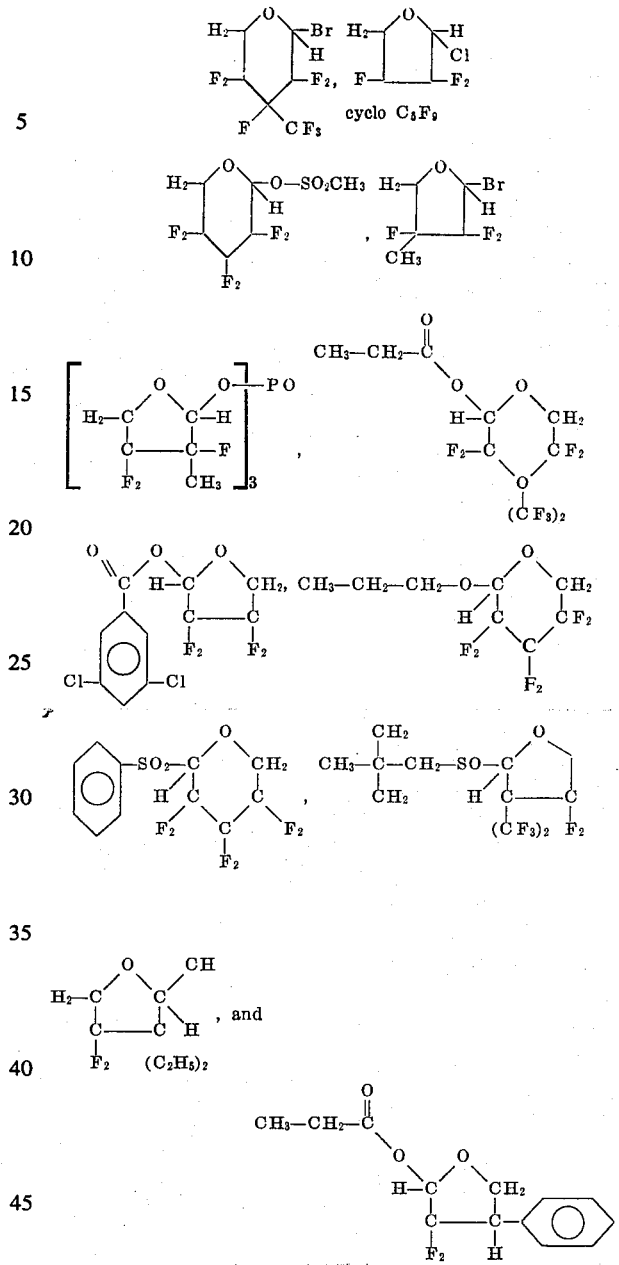

Typical of the compounds of the instant invention are: the benzene sulfonate, decylbenzenesulfonate, octylbenzenesulfonate, dodecylbenzenesulfonate, methylsulfonate, methyl methylphosphonate, tertiary phosphite, secondary phosphite, methyl phenylphosphonate, dimethylphosphinate, diphenylphosphinate, methyl methylphosphonite dimethylphosphinite, diphenylphosphinite, propionate, butyrate, valerate, undecylenate, stearate, oleate, caprylate, acrylate, methacrylate, acetylenecarboxylate, acetylenedicarboxylate, phthalate, terephthalate, methylbenzoate butylbenzoate, cyclohexylcarboxylate, cyclopentylcarboxylate, cycloheptylcarboxylate, esters of 2-hydroxy-3,3-difluorotetrahydropyran, 2-hydroxy-4,4difluorotetrahydropyran, 2-hydroxy-5,5-difluorotetrahydropyran, 2-hydroxy-3,3,4,4-tetrafluorotetrahydropyran, 2-hydroxy-3,3,4,5-tetrafluorotetrahydropyran, 2-hydroxy-3,3,5,5-tetrafluorotetrahydropyran, 2-hydroxy-4,4,5,5- tetrafluorotetrahydropyran, 2-hydroxy-3,4,4,5,5-pentafluorotetrahydropyran, 2-hydroxy-3,3,4,5,5pentafluorotetrahydropyran 2-hydroxy-3,3,4,4,5-pentafluorotetrahydropyran, 2-hydroxy-3-trifluoromethyltetrahydropyran, 2-hydroxy-3-pentafluoroethyltetrahydropyran, 2-hydroxy-3-heptafluoropropyltetrahydropyran, 2-hydroxy-3-nonafluorobutyltetrahydropyran, 2-hydroxy-4-trifluoromethyltetrahydropyran, 2-hydroxy-4-pentafluoroethyltetrahydropyran, 2-hydroxy-4-heptafluoropropyltetrahydropyran, 2-hydroxy-4-perfluoroundecyltetrahydropyran, 2-hydroxy-4-perfluorocyclobutyltetrahydropyran, 2-hydroxy-4-perfluorocyclopentyltetrahydropyran, 2-hydroxy-4-perfluorocyclohexyltetrahydropyran, 2-hydroxy-4-perfluorophenyltetrahydropyran, 2-hydroxy-4-trifluoromethyl-3,3,4,5,5-pentafluorotetrahydropyran, 2-hydroxy-4-trifluoromethyl-3,3,5,5-tetrafluorotetrahydropyran, 2-hydroxy-4-trifluoromethyl, 3,3,4-trifluorotetrahydropyran, 2-hydroxy-4-trifluoromethyl-3,3-difluorotetrahydropyran, 2-hydroxy-4-trifluoromethyl-5,5-difluorotetrahydropyran, 2-hydroxy-5-trifluoromethyl-3,3,4,4,5-pentafluorotetrahydropyran, 2-hydroxy-5-trifluoromethyl-3,3,4,4-tetrafluorotetrahydropyran, 2-hydroxy-5-trifluoromethyl-3,4-difluorotetrahydropyran 2-hydroxy-5-trifluoromethyl-4,4-difluorotetrahydropyran, 2-hydroxy-5-pentafluoroethyl-4,4-difluorotetrahydropyran, 2-hydroxy-5-pentafluoroethyl-3,3,4,4-tetrafluorotetrahydropyran, 2-hydroxy-4,4-bis(trifluoromethyl)-3,3,5,5-tetrafluorotetrahydropyran, 2-hydroxy-4,4-bis(trifluoromethyl)-3,3-difluorotetrahydropyran, 2-hydroxy-4,4-bis(trifluoromethyl)-5,5-difluorotetrahydropyran, 2-hydroxy-4,4-bis(trifluoromethyl)-3,3,5-trifluorotetrahydropyran, 2-hydroxy-4,4-dimethyl-3,3,5,5-tetrafluorotetrahydropyran, 2-hydroxy-4,4-dimethyl-3,3-difluorotetrahydropyran, 2-hydroxy-4,4-dimethyl-5,5-difluorotetrahydropyran, 2-hydroxy-4,4-dimethyl-3,3,5-trifluorotetrahydropyran, 2-hydroxy-4,4-dimethyl-3,5,5-trifluorotetrahydropyran, 2-hydroxy-4,4-dimethyl-3,5,5-trifluorotetrahydropyran, 2-hydroxy-4-methyl-4-ethyl-3,3,5,5-tetrafluorotetrahydropyran, 2-hydroxy-3,5-difluoro-4,4-dimethyltetrahydropyran, 2-hydroxy-4,4-diethyl-3,3,5,5-tetrafluorotetrahydropyran, 2-hydroxy-3,3-difluorotetrahydrofuran, 2-hydroxy-4,4-difluorotetrahydrofuran, 2-hydroxy-3,3,4,4-tetrafluorotetrahydrofuran, 2-hydroxy-3,3,4-trifluorotetrahydrofuran, 2-hydroxy-3,4,4-trifluorotetrahydrofuran, 2-hydroxy-3,4-difluorotetrahydrofuran, 2-hydroxy-3-trifluoromethyltetrahydrofuran, 2-hydroxy-3-pentafluoroethyltetrahydrofuran, 2-hydroxy-3-heptafluoropropyltetrahydrofuran, 2-hydroxy-3-nonafluorobutyltetrahydrofuran, 2-hydroxy-4-trifluoromethyltetrahydrofuran, 2-hydroxy-4-pentafluoroethyltetrahydrofuran, 2-hydroxy-4-heptafluoropropyltetrahydrofuran, 2-hydroxy-4-perfluoroundecyltetrahydrofuran, 2-hydroxy-4-perfluorocyclobutyltetrahydrofuran, 2-hydroxy-4-perfluorocyclopentyltetrahydrofuran, 2-hydroxy-4perfluorocyclohexyltetrahydrofuran, 2-hydroxy-4-perfluorophenyltetrahydrofuran, 2-hydroxy-4-trifluoromethyl-3,3,4- trifluorotetrahydrofuran, 2-hydroxy-4-trifluoromethyl-3,3-difluorotetrahydrofuran, 2-hydroxy-4-trifluoromethyl-4-fluorotetrahydrofuran, 2-hydroxy-4-trifluoromethyl-3-fluorotetrahydrofuran, 2-hydroxy-4-ethyl-3,3-difluorotetrahydrofuran, 2-hydroxy-4-methyl-3,3-difluorotetrahydrofuran, 2-hydroxy-4-phenyl-3,3-difluorotetrahydrofuran, 2-hydroxy-3-phenyl-4,4-difluorotetrahydrofuran, 2-hydroxy-4,4-bis(trifluoromethyl)tetrahydrofuran, 2-hydroxy-4-trifluoromethyl-4-heptafluoropropyl-3,3-difluorotetrahydrofuran, 2-hydroxy-3,3-bis(pentafluoroethyl)-tetrhydrofuran, 2-hydroxy-3,4-bis(pentafluoroethyl)-3,4-difluorotetrahydrofuran, 2-hydroxy-4,4-diethyl-3,3-difluorotetrahydrofuran, 2-hydroxy-3,3-diethyl-4,4-difluorotetrahydrofuran, 2-hydroxy-3-methyl-3-trifluoromethyl-4,4-difluorotetrahydrofuran, 2-hydroxy-3-trifluoromethyl-4-pentafluoroethyltetrahydrofuran. The preferred compositions of the present invention are of the formula:

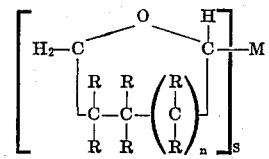

wherein n is from 0 to 1, wherein R is selected from the group consisting of fluorine, perfluoroalkyl, perfluorocycloalkyl and perfluoroaryl, s is a number from one to three inclusive, and M is selected from the group consisting of fluorine, chlorine, bromine, iodine, cyano, alklycarbonyloxy, arylcarbonyloxy, cycloalkylcarbonyloxy, alkylsulfonyloxy, cycloalkylsulfonyloxy, arylsulfonyloxy, phosphinylidynetrioxy, phosphinidynetrioxy, alkoxyphosphinidenedioxy, dialkoxyphosphinoxy, aryloxyphosphinidenedioxy, diaryloxyphosphinoxy, alkylphosphinylideneoxy, arylphosphinyldenedioxy, sulfonyl and sulfinyl.

Among the various R's, perfluoroalkyl radicals usually contain from about one to about 12 carbon atoms, preferably from about one to about six carbon atoms, while perfluorocycloalkyl usually contains from about three to about 12 carbon atoms, preferably from about five to about seven carbon atoms. The perfluoroaryl radicals usually contain from six to about 20 carbon atoms, preferably from about six to about 10 carbon atoms. Phenyl and perfluorophenyl are also preferred embodiments of the R radicals.

Even more preferred compositions of the present invention are of the aforementioned general formula wherein n is from 0 to 1 and the R's are independently selected from the group consisting of hydrogen and fluorine, provided that at least one of the R's is fluorine.

Among the various M groups, the alkylcarbonyloxy, alkylsulfonyloxy, alkyoxyphosphinidenedioxy, dialkyoxyphosphinoxy and alkylphosphinyldenedioxy contain from about one to about 12 carbon atoms, preferably from about one to about six carbon atoms. The cycloalkylcarbonyloxy and cycloalkylsulfonyloxy groups usually contain from about three to about 12 carbon atoms, preferably from about five to about seven carbon atoms. The aryloxyphosphinidenedioxy, diaryloxyphosphinoxy, arylphosphinylidenedioxy, arylcarbonyloxy cyano the arylsulfonyloxy contain from about six to about 20 carbon atoms, preferably from about five to about 10 carbon atoms. The aforementioned M groups may contain non-interfering substitutes on the alkyl and aryl moieties such as, chlorine iodine, bromine, fluorine, nitro, amino and cyanide. Preferred embodiments are when the phenyl ring is substituted by up to five halogen atoms (preferably chlorine or fluorine), alkyl of one to sulfonyl, sulfinyl, carbon atoms or $NO_2$.

Preferred compositions of the present invention are of the aforementioned general formula wherein $n$ is from 0 to 1 and M is selected from the group consisting of fluorine, chlorine, bromine, iodine, cyano, sulfonyl, sulfinyl, phosphinylidetrioxy and phosphinidynetrioxy.

Two sets of reactions illustrate the processes of this invention. The first equation is as follows:

(1a)

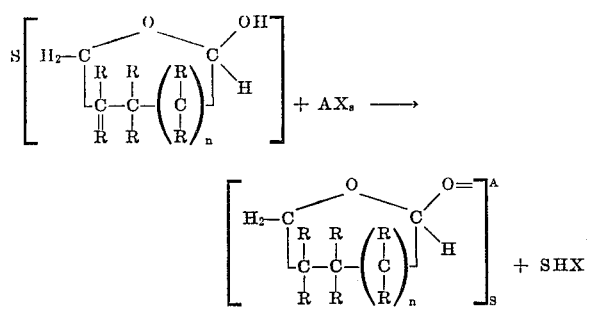

b. $sHX + sB \longrightarrow sB: HX$ wherein $n$ is a number from 0 to 1, wherein one of the R's is selected from the group consisting of fluorine, alkyl cycloalkyl, aryl, perfluoroalkyl, perfluorocycloalkyl and perfluoroaryl, wherein another one of the R's may be selected from the group consisting of alkyl and perfluoroalkyl, wherein the remaining R's are selected form the group consisting of hydrogen and fluorine, provided that at least one of the R's contains fluorine or is fluorine, $s$ is a number from one to three inclusive, A is a substance selected from the group consisting of alkylcarbonyl, cycloalkylcarbonyl, arylcarbonyl, alkylsulfonyl, arylsulfonyl, cycloalkylsulfonyl, sulfonyl, sulfinyl, phosphinylidyne, phosphinidyne, alkoxyphosphinidene, dialkoxyphosphino, aryloxyphosphinidene, diaryloxyphosphino, alkylphosphinylidene, and arylphosphinylidene, X is selected from the group consisting of fluorine, chlorine and bromine, and B is a substance selected from the group consisting of pyridine, alkyl substituted pyridine, N, N-dialkylaniline, trialkylamine, quinoline, isoquinoline, tetraalkyl ammonium hydroxide, ammonium hydroxide and alkali metal hydroxide.

In equation 1a. The fluorine containing hydroxytetrahydropyrans or furans are reacted with an acyl halide to produce an ester, one of the embodiments of this invention, and an acid; in order to complete the desired reaction and to facilitate the isolation of the product this acid is concurrently converted to a salt by the action of the base which is present in the reaction mixture as shown in equation 1 b.

This process can be effected in a variety of solvents, preferably from about 0.2 parts to about 3 parts solvent per part of furan or pyran; when the desired product is a sulfonate ester, an aqueous solvent is satisfactory, whereas when the desired product is a carboxylate, sulfite, sulfate, phosphite, phosphate or phosphonate ester, non-aqueous, non-hydroxylic solvents such as ethers, preferably an ether of from about one to 20 carbon atoms, (diethyl ether, tetrahydrofuran, dioxane and the like), hydrocarbons, preferably a hydrocarbon from about one to about 20 carbon atoms, (pentane, hexane, benzene, toluene, and the like), halogenated hydrocarbons, preferably from about one to about 20 carbon atoms, (such as methylene chloride, chloroform, carbon tetrachloride and the like) or a stoichiometric excess of the non-hydroxylic organic bases previously described are to be preferred. The temperatures to be employed in this process of this invention are from about 0°C. to about 100°C., preferably from about 20°C. to about 80°C.

The second reaction is as follows:

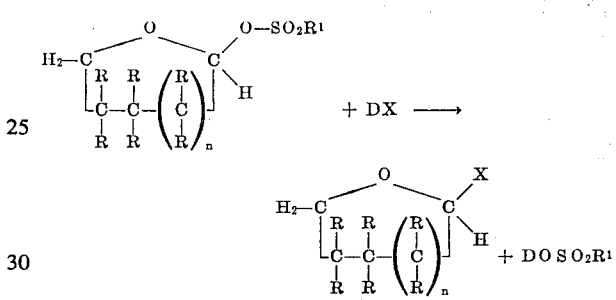

wherein $n$ is a number from 0 to 1, wherein one of the R's is selected from the group consisting of fluorine, alkyl, cycloalkyl, aryl, perfluoroalkyl, perfluorocycloalkyl and perfluoroaryl, wherein another one of the R's may be selected from the group consisting of alkyl and perfluoroalkyl, wherein the remaining R's are selected from the group consisting of hydrogen and fluorine, provided that at least one of the R's contains fluorine or is fluorine, $R^1$ is selected from the group consisting of hydrogen, alkyl and aryl, preferably an alkyl of from about one to about 20 carbon atoms and an aryl of from about six to about 20 carbon atoms, D is selected from the group consisting of sodium, potassium, lithium, rubidium, cesium, ammonium and X is a substance selected from the group consisting of Br, Cl, I, CN. The preferred aryl and alkyl substituents are unsubstituted aryl, unsubstituted alkyl, aryl and alkyl substituted with about three preferably about two to about one substitutents selected from the group consisting of cyanide, fluorine, chlorine, bromine, iodine, nitro and amino.

The preferred second reaction is as follows:

2.

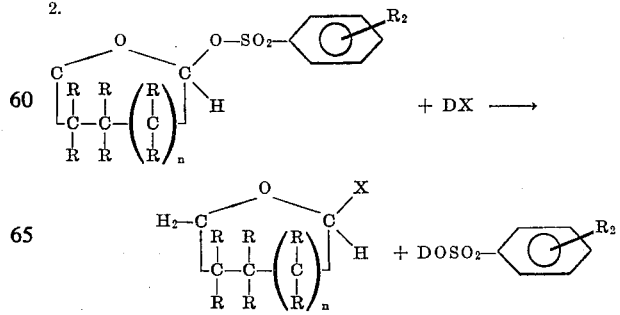

wherein n is a number from 0 to 1, wherein R is selected from the group consisting of fluorine, perfluoroalkyl, perfluorocycloalkyl and perfluoroaryl, $R^2$ is selected from the group consisting of hydrogen and alkyl, preferably an alkyl of from about one to about 20 carbon atoms, D is selected from the group consisting of sodium, potassiu, lithium, rubidium, cesium, ammonium and X is a substance selected from the group consisting of Br, Cl, I, CN.

Solvents which may be used in the process of this invention, include ethers and glycols of from about one to about 20 carbon atoms, such as, diethylene glycol, triethylene glycol, methoxytriglycol, dipropylene glycol, monobutyl ether of diethylene glycol, ethoxytriglycol, hexyl ether of diethylene glycol, 1-butyoxyethoxy-2-propane and glycerine. From about 0.2 part solvent to about 3 solvent are preferably used per 1 part of the furan or pyran.

Generally in both reaction 1 and reaction 2, stoichiometric quantities of the reactants are used, preferably an excess of Ax in reaction 1 and an excess of DX in reaction 2 are used. The preferred R and M substituents are as previously stated.

The preparation of the starting compound, the 2-hydroxytetrahydropyrans and the 2-hydroxytetrahydrofurans, is disclosed in copending application Ser. No. 867,060, filed on even date herewith and now abandoned.

The compositions of this invention have utility as chemical intermediates, as indicated by the following equation:

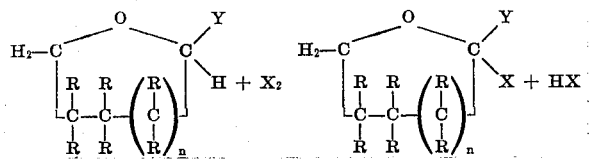

wherein n is a number from 0 to 1 inclusive, R is a substance selected from the group consisting of hydrogen, fluorine, perfluoroalkyl, perfluorocycloalkyl, perfluoroaryl, alkyl, cycloalkyl and aryl and mixtures thereof, and wherein at least one of the R's contains fluorine, Y is selected from the group consisting of F, Br, Cl, I and X is selected from the group consisting of Cl and Br.

Specific and typical processes of this invention are described below:

A.

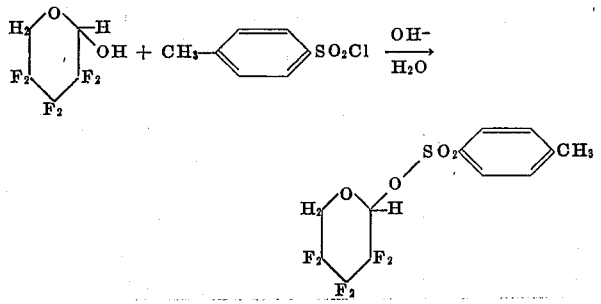

2-Hydroxy-3,3,4,4,5,5-hexafluorotetrahydropyran (also called the hemiacetal or hydroxypyran) and toluenesulfonyl chloride are reacted together in the presence of an aqueous base to give the p toluenesulfonate ester of the aforesaid hydroxypyran and the chloride salt of the base used.

B.

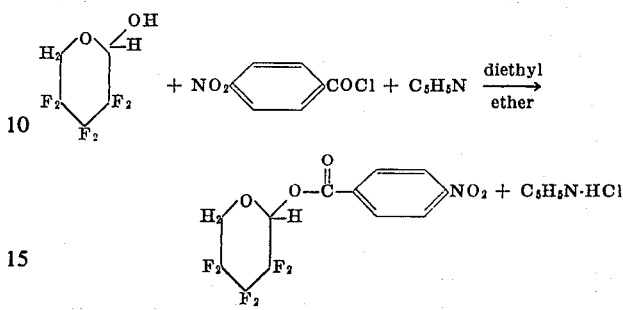

The hemiacetal and p-nitrobenzoyl chloride were reacted in the presence of pyridine in anhydrous diethyl ether to form the p-nitrobenzoate of 2-hydroxy-3,3,4,4,5,5-hexafluorotetrahydropyran.

C.

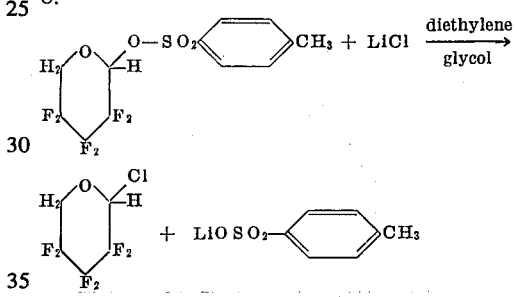

The p-toluene sulfonate ester of the hemiacetal is reacted with lithium chloride to produce 2-chloro-3,3,4,4,5,5-hexafluorotetrahydropyran. Among the salts which will undergo this type of reaction are lithium bromide, lithium chloride, sodium iodide and potassium and sodium cyanide are preferred. Temperatures up to about 300°C. may be employed, the actual temperature limitation being defined by the solvent employed and the type of salt being used.

The equation also illustrates utility for one of the embodiments of this invention, namely the p-toluene sulfonate ester of 2-hydroxy-3,3,4,45,5-hexafluorotetrahydropyran, in that it may be converted to a second embodiment of this invention, namely 2-chloro-3,3,4,4,5,5-hexafluorotetrahydropyran.

(ii)

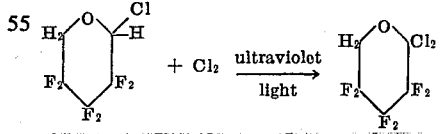

Chlorination of 2-chloro-3,3,4,4,5,5-hexafluorotetrahydropyran in the presence of ultraviolet light produced the geminal dichloro derivative.

This equation also illustrates utility for one of the embodiments of this invention namely, 2-chloro-3,3,4,4,5,5-hexafluorotetrahydropyran, in that it is converted to 2,2-dichloro-3,3,4,4,5,5--hexafluorotetrahydropyran.

The compositions of this invention are useful in improving the clarity of polymer films, such as polyvinyl chloride, in improving the stability of polymer films, as materials showing herbicidal activity, and as chemical intermediates in the preparation of other useful materials.

The following examples will further illustrate specific embodiments of this invention. It should be understood however that these examples are given by way of illustration and not limitation. All temperatures are in degrees centigrade and all parts are by weight, unless otherwise indicated.

EXAMPLE 1

2-Hydroxy-3,3,4,4,5,5-hexafluorotetrahydropyran, called the pyran or hemiacetal in later examples, (70 parts, 0.33 mole), p-toluenesulfonyl chloride (63 parts, 0.33 mole) and water (100 milliliters) were placed in a three-necked flask equipped with an additional funnel, a mechanical stirrer, a thermometer and a reflux condenser and heated to 50°C. To this stirred mixture was added a solution of sodium hydroxide, 14 parts of sodium hydroxide in 55 parts water, at a rate such that the temperature of the reaction remained below about 65°C. After the addition was complete, the mixture was allowed to stir for about 1 hour while it cooled. Sufficient diethyl ether was then added to the cold mixture to dissolve the precipitated solids and yield two phases; these were separated and the aqueous phase was extracted with two 49 part by weight portions of ether. The ether portions were combined and washed with three about one hundred part portions of concentrated ammonium hydroxide to remove unreacted acyl chloride. Evaporation of the ether led to the isolation of 111 parts of white solid for a 92 percent yield of the crude p-toluenesulfonate ester of the hemiacetal (described as above). Two recrystallizations from a mixture of benzene and petroleum ether yielded material, melting point 84.2° to 85°C. having the following analyses:
Found: percent C, 40.05, 40.22; average 40.14; percent H, 2.86, 3.03; average 2.95; percent S, 9.32, 9.39; average 9.35; percent F, 31.5, 30.4; average 30.95. Calculated for $C_{12}H_{10}F_6O_4S$: percent C, 39.6; percent H, 2.7; percent S, 8.8; percent F, 31.3. The infrared spectrum of this material is one file and indicated that the product was the p-toluene sulfonate ester at 2-hydroxy-3,3,4,4,5,5-hexafluorotetrahydropyran.

In a similar manner p-toluenesulfonyl chloride and 2-hydroxy-3,3,4,4-tetrafluorotetrahydrofuran are reacted in a solution of comparable concentration of sodium hydroxide in water. The p-toluene-sulfonate ester of 2-hydroxy-3,3,4,4-tetrafluorotetrahydrofuran is separated from the reaction mixture by recrystallization.

EXAMPLE 2

The procedure of Example 1 was repeated with the hemiacetal (described as in Example 1, 21 parts, 0.1 moles), p-toluenesulfonyl chloride (19 parts, 0.1 moles), water and aqueous sodium hydroxide (4.3 parts in 15 to 20 parts of water). The crude p-toluenesulfonate ester of the hemiacetal was recrystallized once from a mixture of benzene and petroleum ether to give 14 parts of material, melting point 86°to 87.5°C. (with a calibrated thermometer). Partial evaporation of the mother liquor led to a second crop, melting point 86°to 88°C. (with a calibrated thermometer); complete evaporation of the solvent from the resulting filtrate yielded six parts of a residue.

In separate experiments, 2-hydroxy-3,3,4,4-tetrafluorotetrahydrofuran, 2-hydroxy-3,3-difluorotetrahydrofuran, 2-hydroxy-3,4-difluorotetrahydrofuran 2-hydroxy-3,3-difluorotetrahydropyran, 2-hydroxy-4,4-difluorotetrahydropyran, 2-hydroxy-3,4,5-trifluorotetrahydropyran, 2-hydroxy-3,3,4,5-tetrafluorotetrahydropyran and 2-hydroxy-3,4,4,5-tetrafluorotetrahydropyran are reacted with p-toluenesulfonyl chloride in a similar manner to produce the corresponding p-toluenesulfonate esters.

Also in separate experiments and in a similar manner, 2-hydroxy-3-trifluoromethyltetrahydropyran, 2-hydroxy-3-pentafluoroethyltetrahydropyran, 2-hydroxy-4,4-dimethyl-3,3,5,5-tetrafluorotetrahydropyran, 2-hydroxy-4-perfluorooundecyltetrahydrofuran, 2-hydroxy-4-ethyl-3,3-difluorotetrahydrofuran and 2-hydroxy-4-phenyl-3,3-difluorotetrahydrofuran are reacted with p-toluenesulfonyl chloride, ethylsulfonyl chloride, sulfinyl chloride and ethylsulfinyl chloride to produce the corresponding p-toluenesulfonate, ethylsulfonate, sulfinate and ethylsulfinate.

EXAMPLE 3

Pentachlorobenzoyl chloride (4.5), the hemiacetal as defined in Example 1 (10 parts), and pyridine (25.6 parts), were warmed together for a few minutes and then poured with stirring into water. The liquid was removed by decantation, the solid was washed with dilute aqueous sodium carbonate and recrystallized from ethanol. Subsequent recrystallization (twice) from ethanol led to purified pentachlorobenzoate ester of 2-hydroxy-3,3,4,4,5,5-hexafluorotetrahydropyran, melting point 132.5° to 133°C. having the following analyses: Found: percent C, 29.85, 29.69, average 29.77; percent H, 0.48; percent Cl, 35.7, 35.4; average 35.6; percent F, 21.6, average 21.7; calculated for $C_{12}H_3Cl_5F_6O_3$: percent C, 29.6; percent H, 0.62; percent Cl, 36.5 percent F, 23.4. The infrared spectrum of this material is on file.

In a similar manner methyldibromophosphine, diphenylchlorophosphine, and ethanephosphonyl dichloride are reacted with 2-hydroxy-3,3,4,4-tetrafluorotetrahydrofuran, 2-hydroxy-3,4,4,5-tetrafluorotetrahydropyran and 2-hydroxy-2-pentafluoroethyltetrahydropyran in the presence of a comparable concentration of pyridine to form the corresponding esters.

EXAMPLE 4

The benzoate ester of the hemiacetal was prepared in the following way. To a solution of the hemiacetal, defined as in Example 1 (21 parts, 0.1 mole), pyridine (9 parts, 0.1 mole) and anhydrous ether (about 125 parts), contained in a three-necked, round-bottomed flask equipped with a mechanical stirrer, a condenser bearing a drying tube, and an addition funnel was added a solution of benzoyl chloride (fourteen parts, 0.10 mole) in anhydrous ether at such a rate that with moderate cooling the reaction temperature stayed below about 25°C.; addition took less than 10 minutes. The mixture was then let stir for about 1 hour after which time 4 drops of water and 10 drops of pyridine were added (to remove any slight excess of acid chloride), and the mixture was stirred for an additional 10 minutes. After filtering the reaction mixture the filter cake was washed several times with anhydrous ether and this ether removed by filtration. All ether filtrates were combined and excess ether removed by distillation at atmospheric pressure to a vapor temperature of about fifty degrees centigrade. The resulting residue was fractionated at reduced pressure to yield 23 parts, boiling at 88° to 99°C. at 3 millimeters pressure, $n^{24.5}$ 1.4503, which partly crystallized on standing, and 9.5 grams, boiling point 92° to 94.5° C. at 3 millimeters pressure, $n^{24}$ 1.4478. The infrared spectrum of the 8.5 gram sample material indicates the product was the benzoate ester of 2-hydroxy-3,3,4,4,5,5-hexafluorotetrahydropyran.

In a similar manner the benzoate esters of 2-hydroxy-3,3,4,4-tetrafluorotetrahydrofuran, 2-hydroxy-3,4,4,5-tetrafluorotetrahydropyran and 2-hydroxy-2-pentafluoroethyltetrahydropyran are prepared.

EXAMPLE 5

Acetyl chloride (8 parts, 0.1 mole), pyridine (9 parts, 0.1 mole), the hemiacetal defined as in Example 1 (21 parts, 0.1 mole), and anhydrous ether were used to prepare the acetates of the hemiacetal in a manner similar to that of Example 4. There was obtained 13.0 grams, boiling point 75° to 77°C. at 25 millimeters pressure, $n^{24}$ 1.3572, the infrared spectrum indicates the acetate of 2-hydroxy-3,3,4,4,5,5-hexafluorotetrahydropyran.

In a similar manner the acid chlorides of ethanoic acid, acetic acid, butyric acid and valeric acid are reacted with the hemiacetal of Example 1 to produce the corresponding esters.

EXAMPLE 6 p-Nitrobenzoyl chloride (18.6 parts, 0.1 mole), pyridine (nine parts, 0.1 mole), the hemiacetal defined as in Example 1 (21 parts, 0.1 mole) and anhydrous ether were used to prepare the p-nitrobenzoate ester of the hemiacetal in a manner similar to that of Example 4 except that the combined ether filtrates obtained from filtering the reaction mixture and washing the filter cake was treated as follows:

The excess ether was removed by distillation at atmospheric pressure to a vapor temperature of 56°C, then with the heat to the pot removed, additional ether was removed under water aspirator vacuum while the residue cooled. The remaining residue was dissolved in benzene and a large excess of petroleum ether was added. The resulting crystals were filtered off and after drying in air were found to weigh 29.5 parts. Several recrystallizations from cyclohexane led to material, melting point 73° to 74°C, the infrared spectrum of which was put on file.

EXAMPLE 7

The crude p-toluene sulfonate ester of the hemiacetal from Example 1 (106 parts, 0.29 mole), lithium chloride (13 parts, 0.31 mole), and diethylene glycol (122.7 parts) were heated together with stirring in a three-necked flask equipped with a thermometer, a mechanical stirrer and a distilling head with a receiver and condenser connected to a trap cooled in a dry-ice-acetone cooling bath. Distillate was collected up to a vapor temperature of 240° C., at which point it was almost entirely water-soluble. The distillate, after being washed twice with cold water, weighed 58 grams. Fractionation of this material produced about 38 grams of wet distillate which was redistilled from phosphorus pentoxide to yield the following fractions:

1. b. 109°–111° C., 7 g. $n^{20.5}$ 1.3529
2. b. 111°–111.3° C., 5 g. $n^{20.5}$ 1.3535 $d^{20}$ 1.64
3. b. 111.3°–111.3° C., 5 g. $n^{20.5}$ 1.3535
4. b. 111.3°–111.5° C., 16 g. $n^{20.5}$ 1.3540

The infrared spectrum of fraction two showed the presence of no carbonyl or C=C absorptions, but whowed CH and CF absorptions. Analysis of cut 3 showed: percent C, 26.53, 26.6, average 26.39; percent H, 1.41. 1.22, average 1.32; percent Cl, 15.45, 15.39, average 15.42; percent F, 49.1, 50.3, average 49.7. Calculated for $C_5H_3F_6ClO$: percent C, 26.3; percent H, 1.31; percent Cl, 15.5; percent F, 49.9. All these results together with the method of preparation are consistent with the product, boiling point 111.3 degrees centigrade, being 2-chloro-3,3,4,4,5,5-hexafluorotetrahydropyran:

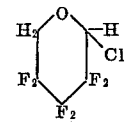

Additional confirmation of the structure was gained from the following experiments.

3,3,4,4,5,5-Hexafluorotetrahydropyran was prepared by heating together 2,2,3,3,4,4-hexafluoropentanediol (100 parts, 0.47 mole) and concentrated sulfuric acid (170 parts, 1.65 moles) to temperatures in excess of 220° C. and collecting the distillate produced. Fractionation of this yielded 59 parts, boiling point 99° to 101° C.; of this a middle portion had a boiling point 100.0 to 100.4° C. $n^{26}$ 1.3226 which by gas chromatography was <99 percent pure. (Literature values for 3,3,4,4,5,5-hexafluorotetrahydropyran are: boiling point 98° to 100° C. at 742 millimeters, $n^{20}$ 1.3250; Henne, A. L. & Richter, S.B., J. Am. Chem. Soc. 74, 5420 (1952)).

3,3,4,4,5,5-Hexafluorotetrahydropyran (43 parts, 0.23 mole) was chlorinated under ultraviolet light in the liquid phase for about 12.5 hours in a round-bottomed flask equipped with a condenser leading to a dry ice trap. After shaking with solid sodium carbonate and filtering, the material was distilled to give a liquid boiling point 128° to 131° C., $n^{20.5}$ 1.378. The infrared spectrum of a center portion, boiling at 130.5° C. was consistent with the structure:

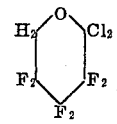

no carbonyl absorption was observed although both CH and CF absorptions were present. Further liquid phase chlorination led to the isolation of about 28 parts of material, boiling point 159° to 162.5° C. This included material, boiling point 161° to 162° C., $n^{20}$ 1.4001, $d^{20}/4$ 1.76. The infrared spectrum of this material showed no C—H and did show a band in the range 5.45–5.65 $\mu$ attributable to a C=O in a perfluorinated acyl chloride. It appeared to be substantially the known $CCl_3(CF_2)_3COCl$, boiling point 165°, $n^{25}$ 1.3966 (Tiers, G.V.D., J. Am. Chem. Soc., 77, 6704)); addition to cold concentrated ammonium hydroxide led to the recovery after filtration and recrystallization from aqueous ethanol, of the known $CCl_3(CF_2)_3CONH_2$, melting point 137° to 138° C. (Tiers, loc. cit, melting poing 138.3° C.

Liquid phase chlorination of 2-chloro-3,3,4,4,5,5-hexafluorotetrahydropyran (28 parts) in a manner like that used above for 3,3,4,4,5,5-hexafluorotetrahydropyran let to the recovery of a material having a boiling point of 128° to 133° C., a center portion boiling point 131° C., $n^{20.5}$ 1.3793, and having an infrared spectrum indicating that it was substantially 2,2-dichloro-3,3- 4,4,5,5-hexafluorotetrahydropyran. Further chlorination of it also produced the known $CCl_3(CF_2)B(3COCl$.

The following examples indicate typical utility for the compositions of this invention.

EXAMPLE 8

A polyvinyl chloride film was prepared from a mixture of polyvinyl chloride (50 parts), di-2-ethylhexylphthalate (27.5 parts), and barium cadmium laurate (one part), by mixing it in a rubber mill set at 149° C. for about 3 minutes and milling it in said mill for about 5 minutes. The film produced and used as the reference standard and had a thickness of about 56 mils.

Two other films were made in a similar manner except that one contained 0.25 part of the benzoate ester of 2-hydroxy-3,3,4,4,5,5-hexafluorotetrahydropyran and the other 0.25 part of the acetate ester of said pyran; their thicknesses were about 52 mils and 57 mils respectively.

The absorption of light of wave length about 4,400 A was then determined for a sample of each of the three films with the results shown in the table.

|  | Reference Standard | Benzoate ester of 2-hydroxy-3,3,4,4,5,5-hexafluorotetrahydropyran | Acetate ester of 2-hydroxy-3,3,4,4,5,5-hexafluoro tetrahydropyran. |
|---|---|---|---|
| Absorbtion at 4,400 A | 0.324 | 0.226 | 0.305 |
| Thickness, Mils | 56 | 52 | 57 |

The absorbtions lower than the reference standard indicate improvement in optical clarity.

In a similar manner 2-hydroxy-3,3,4,4-tetrafluorotetrahydrofuran is added to a polyvinyl chloride film and the clarity is compared to the clarity of a film prepared without it.

EXAMPLE 9

Polyvinyl chloride films were prepared as described in the preceding example (Example 8), one as a reference standard and one containing the p-nitrobenzoate ester of 2-hydroxy-3,3,4,4,5,5-hexafluorotetrahydropyran (0.25 part). The milled sheets were cut into ¾ inch rectangles, and placed in a 350° F. oven on glass plates. Samples were removed from the oven at 15 minute intervals; this accelerated aging test was continued until complete blackening of the fibers occurred and then for a short time longer. The rectangles were then trimmed to ½ inch by 1 inch rectangles, mounted, and examined.

The control showed color development after 45 minutes of aging at 350° F. while the test sample lasted 15 to 30 minutes longer before showing such color, thus indicating the composition of this invention had utility as a vinyl stabilizer.

EXAMPLE 10

The various new compositions of this invention were examined for herbicidal activity in preliminary greenhouse tests. Plots containing seedlings of rye, millet, and cucumber were sprayed at the rate of 4 pounds per acre when the seedlings were two to three weeks old. The spray comprised the chemicals being tested contained in water which in turn contained about 0.5 volume percent of a mixture of emulsifier, xylene and isophorone. The seedlings were examined about 2 weeks after application, the results are shown in the table and indicate that the materials are phytotoxic.

| Compound | Rye | Millet | Cucumber |
|---|---|---|---|
| pyran with $OC(O)-C_6H_5$ substituent | 1 | 4 | 3 |
| pyran with $OC(O)CH_3$ substituent | 1 | 4 | 3 |
| pyran with $OSO_2C_6H_4OCH_3(p)$ substituent | 0 | 3 | 2 |
| pyran with $O-C(O)-C_6Cl_5$ substituent | 1 | 3 | 3 |
| pyran with $OC(O)-C_6H_4-NO_2(p)$ substituent | 1 | 5 | 2 |
| pyran with $Cl$ substituent | 1 | 5 | 3 |

Amount of topkill indicated on a scale of 0–10, 10 indicating complete kill.

The similar esters of 2-hydroxy-3,3,4,4-tetrafluorotetrahydrofuran when sprayed on seedlings in comparable concentrations indicated a similar phytotoxicity.

Various changes and modifications may be made in the composition and methods of this invention, certain preferred forms of which have been herein described, without departing from the spirit and scope of this invention. These modifications of this basic invention are to be regarded as within the scope and purview of this invention.

We claim:
1. 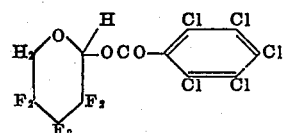

* * * * *

PO-1050
(5/69)

UNITED STATES PATENT OFFICE
CERTIFICATE OF CORRECTION

Patent No. 3,700,695             Dated     October 24, 1972

Inventor(s)   Russell L. K. Carr and Charles F. Baranauckas

It is certified that error appears in the above-identified patent and that said Letters Patent are hereby corrected as shown below:

Column 1, line 56, change the formula from

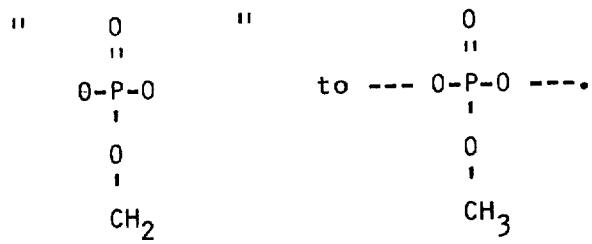

Column 5, lines 2 and 3, "arylecarbonyloxy cyano" should read ---aryl-carbonyl and ---; line 12, "of one to sulfonyl, sulfinyl carbon" should read --- of 1 to 20 carbon atoms---; line 26, change the formula from

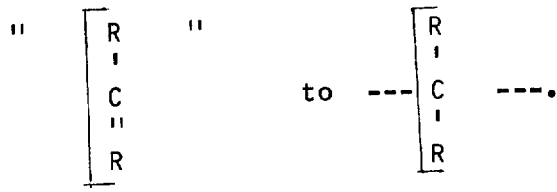

Column 7, line 18, "to about 3 solvent" should read ---to about 3 parts solvent---. Column 10, line 33, "(4.5)," should read ---(4.5 parts),---. Column 13, line 27, change the formula from "$CCl_3(CF_2)B(3COCl.$" to ---$CCl_3(CF_2)_3COCl$.---. Column 14, line 60, change the formula from

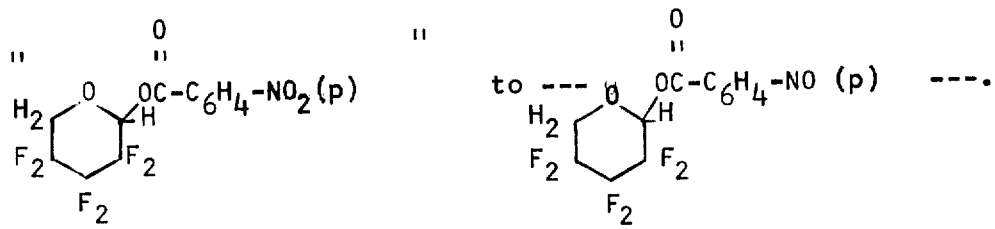

Signed and sealed this 6th day of March 1973.

(SEAL)
Attest:

EDWARD M. FLETCHER, JR.
Attesting Officer

ROBERT GOTTSCHALK
Commissioner of Patents